Sept. 9, 1941.  M. GARBELL  2,255,110

WEIGHING SCALE

Filed Feb. 28, 1938  4 Sheets-Sheet 1

Inventor,
Max Garbell
By Leo J. Dumais
Attorney

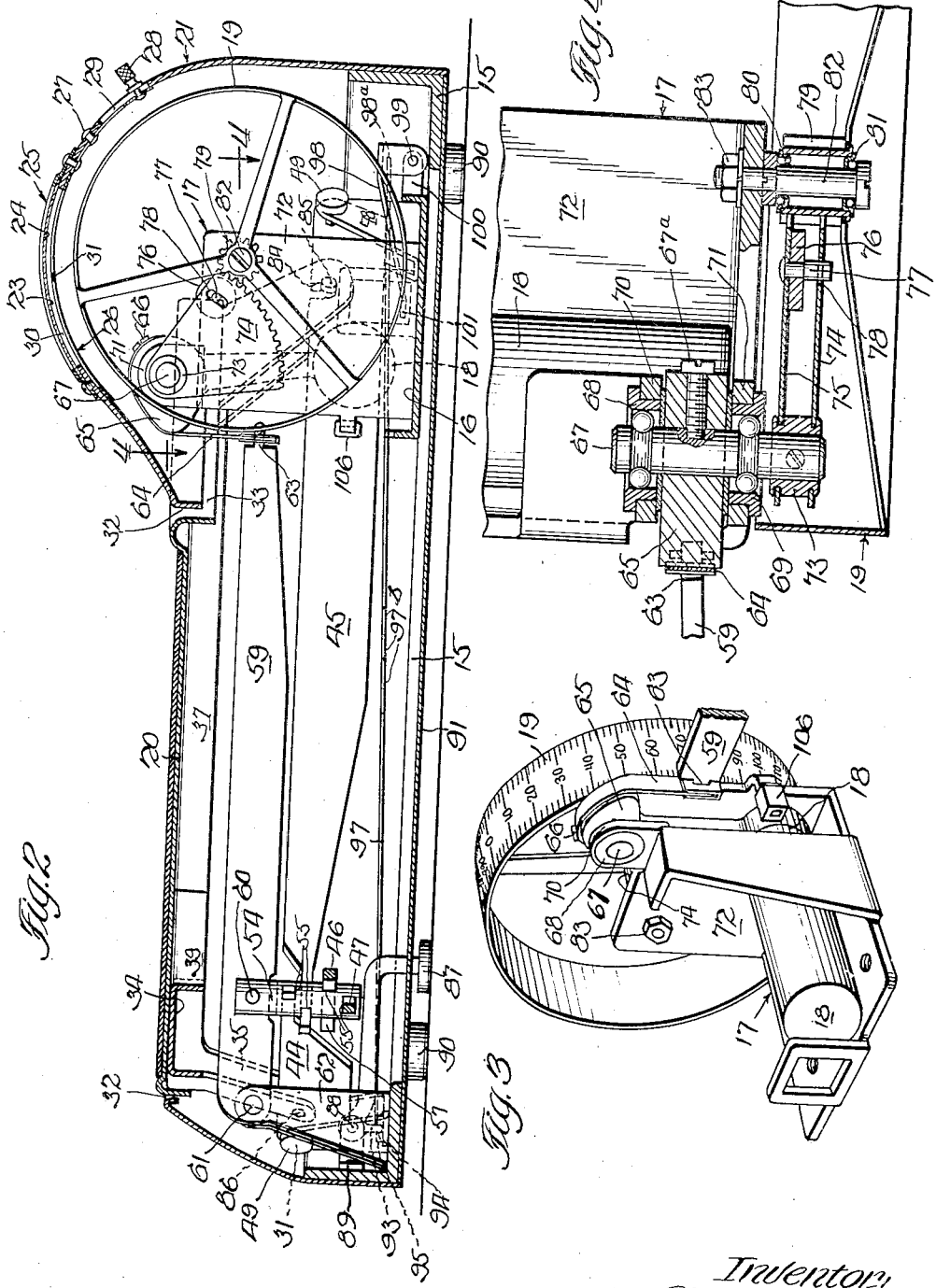

Sept. 9, 1941. M. GARBELL 2,255,110
WEIGHING SCALE
Filed Feb. 28, 1938 4 Sheets-Sheet 3

INVENTOR.
Max Garbell
BY
ATTORNEY.

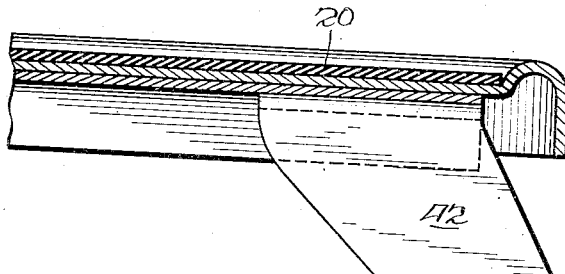
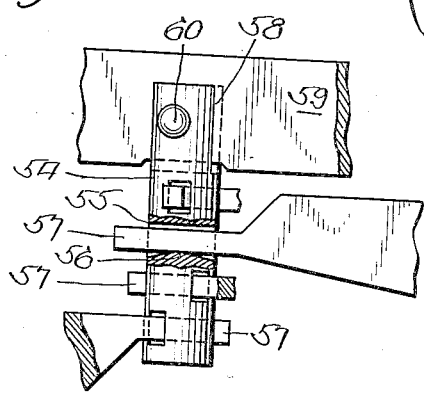
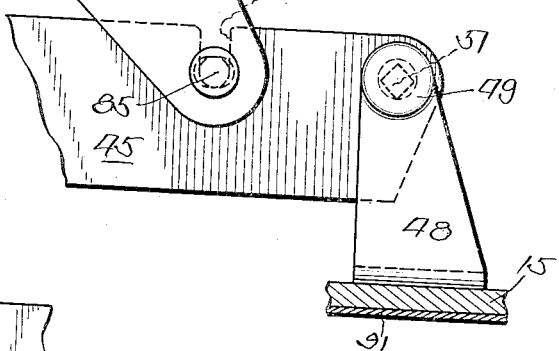
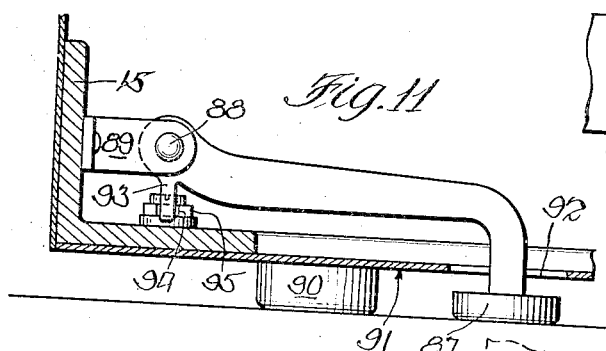
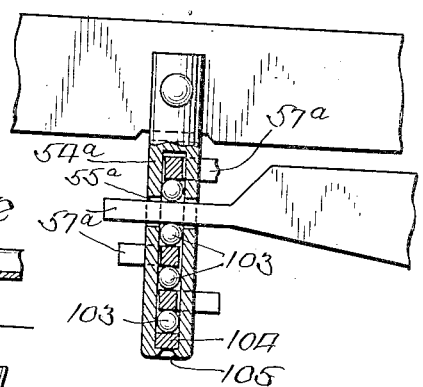
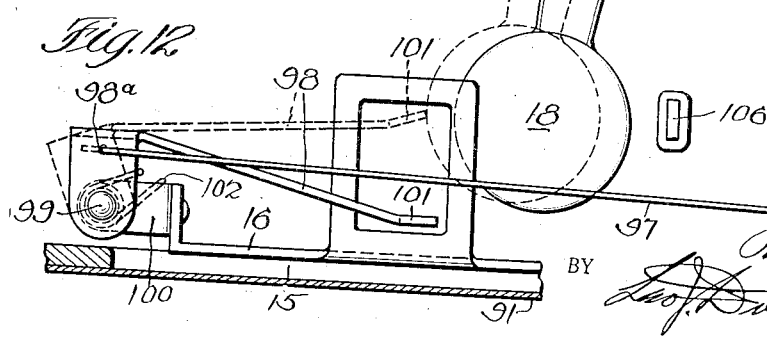

Patented Sept. 9, 1941

2,255,110

UNITED STATES PATENT OFFICE 2,255,110

WEIGHING SCALE

Max Garbell, Chicago, Ill., assignor to Continental Scale Corporation, Chicago, Ill., a corporation of Delaware Application February 28, 1938, Serial No. 192,926

8 Claims. (Cl. 265—62)

The present invention relates to improvements in a weighing scale and is more particularly directed to a small pendulum type of scale which is built close to the floor for convenient use.

Heretofore, it has been impossible to construct a small scale of the pendulum type with a large weighing capacity, say to three hundred pounds, in that the pendulum employed as a counterbalance and the parts associated therewith to operate the dial, would not permit of a compact construction due to the length and weight of the pendulum and to the swing required for its functioning movement, and also the movement of the platform under a load would cause considerable quivering of the indicator due to a person being weighed standing unevenly thereon.

To overcome the above objections, a novel construction of scale has been produced wherein the operative parts are light in weight, strong, durable, inexpensive to manufacture and very sensitive to record the slightest movement of the platform when a weight is placed thereon and wherein an accurate weighing will be recorded when the weight is not evenly distributed on the platform.

An important object of the invention is the provision of individually movable equalizer means on which the platform is positioned and which equalizer means is directed to a common center to which an operating arm is attached to derive its movement therefrom to be transferred to a pendulum which in turn controls the movements of a dial to register the weight placed on the platform.

Another object is the provision of novel means forming the common center for the equalizer means whereby they are each free to rock and move longitudinally while remaining connected with each other.

Another object is the provision of improved pendulum weighing means including means for locking the pendulum when the scale is lifted from the surface on which it rests or during the shipping of the scale.

Another object is the provision of pivotal means aligned with the equalizer means which extends outwardly of the extreme edges of the platform to prevent tilting thereof when a weight is placed on the platform.

And another object is to provide a scale having an angle iron base or frame on which the weighing mechanism is rigidly mounted.

And a further object is the provision of a scale having the pivotal centers of the platform extending outwardly of the extreme edges thereof and inwardly of the pivotal centers of the equalizers on which it is mounted to prevent tilting of the platform under a load.

Among the other numerous advantages are to provide a weighing device having an angle iron base in which the weighing mechanism is mounted in such fashion that the weight placed upon the platform is evenly distributed through the equalizer means to a common center and transmitted through an arm to the pendulum and dial means; a scale which is unusually light due to the use of sheet metal parts and in which the pendulum, dial and the drive means for operating the dial are arranged as a unit to facilitate assembly and to improve by simplifying the design without sacrificing its operating efficiency or cheapening the product, utilizing light materials in a manner to provide rigidity and strength in the finished product, a scale having means associated with the pendulum for locking the same when the scale is lifted from the surface on which it rests.

While this type of scale is susceptible to many uses, it is illustrated as a bathroom scale and in which the dial is of the rotary type and extends above the platform for clearer visibility and its driving means being of a construction to always retain the dial in fixed relation to movements of the pendulum.

Referring to the drawings:

Figure 2 is a longitudinal medial sectional view taken on the line 2—2 of Figure 1.

Figure 3 is a detail perspective view of the unit comprising the pendulum and dial, illustrating a portion of the operating arm attached thereto.

Figure 4 is an enlarged detail partial plan sectional view taken substantially on the line 4—4 of Figure 2.

Figure 8 is an enlarged detail sectional view taken on the line 8—8 of Figure 1.

Figure 9 is an enlarged detail view of the means employed for connecting the equalizer arm with the operating arm.

Figure 10 is an enlarged detail view of a modified form of the means shown in Figure 9.

Figure 11 is an enlarged partial detail view of the means for effecting the locking of the pendulum when the machine is lifted from the surface on which it rests, and taken substantially on the line 11—11 of Figure 1; and Figure 12 is an enlarged detail view of the parts cooperating with the parts shown in Figure 11 for locking the pendulum, taken substantially on the line 12—12 of Figure 1.

Figure 1:
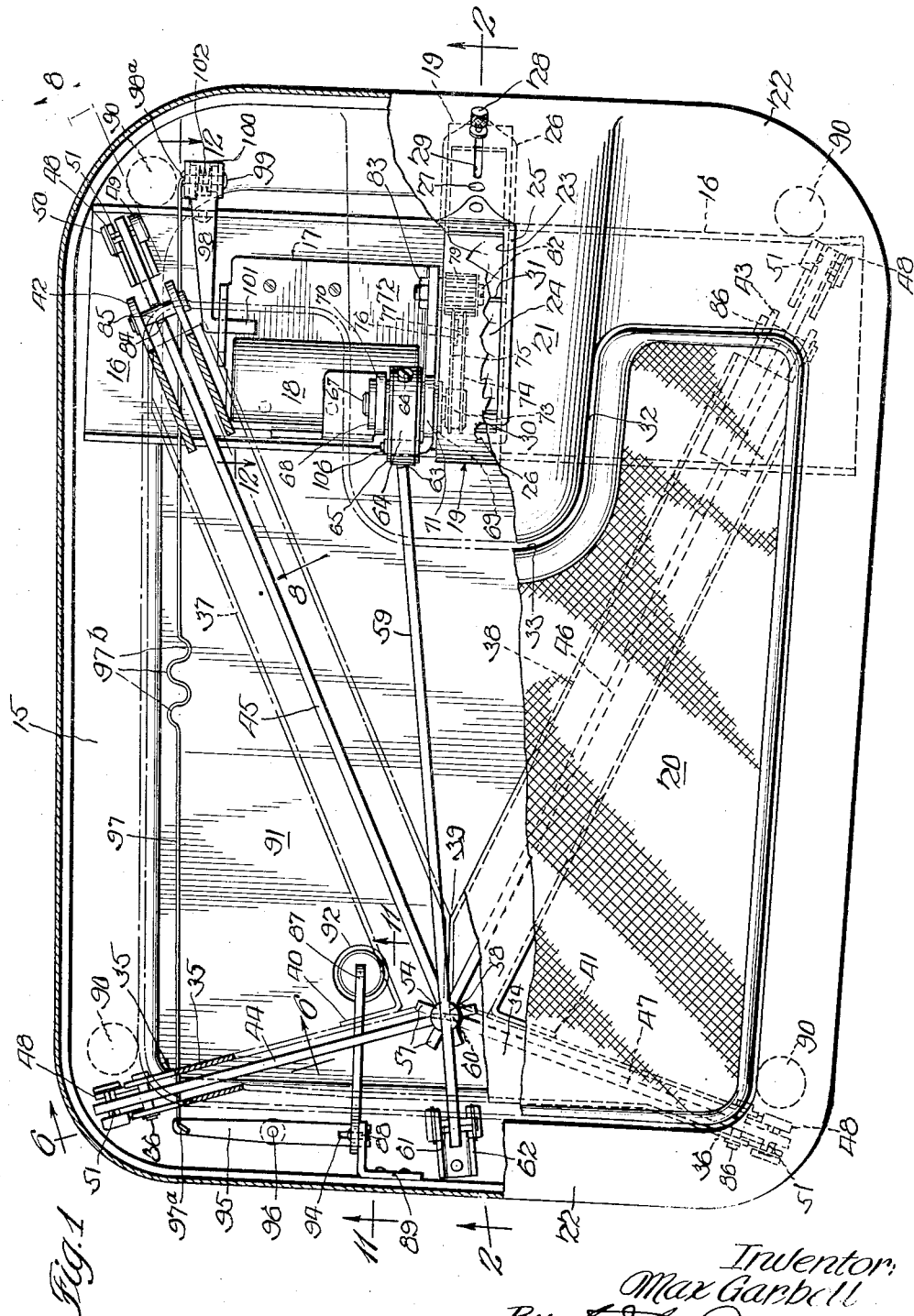
Figure 1 is a top plan view of the scale, illustrating a portion broken away to show the operative parts.
Figure 5:
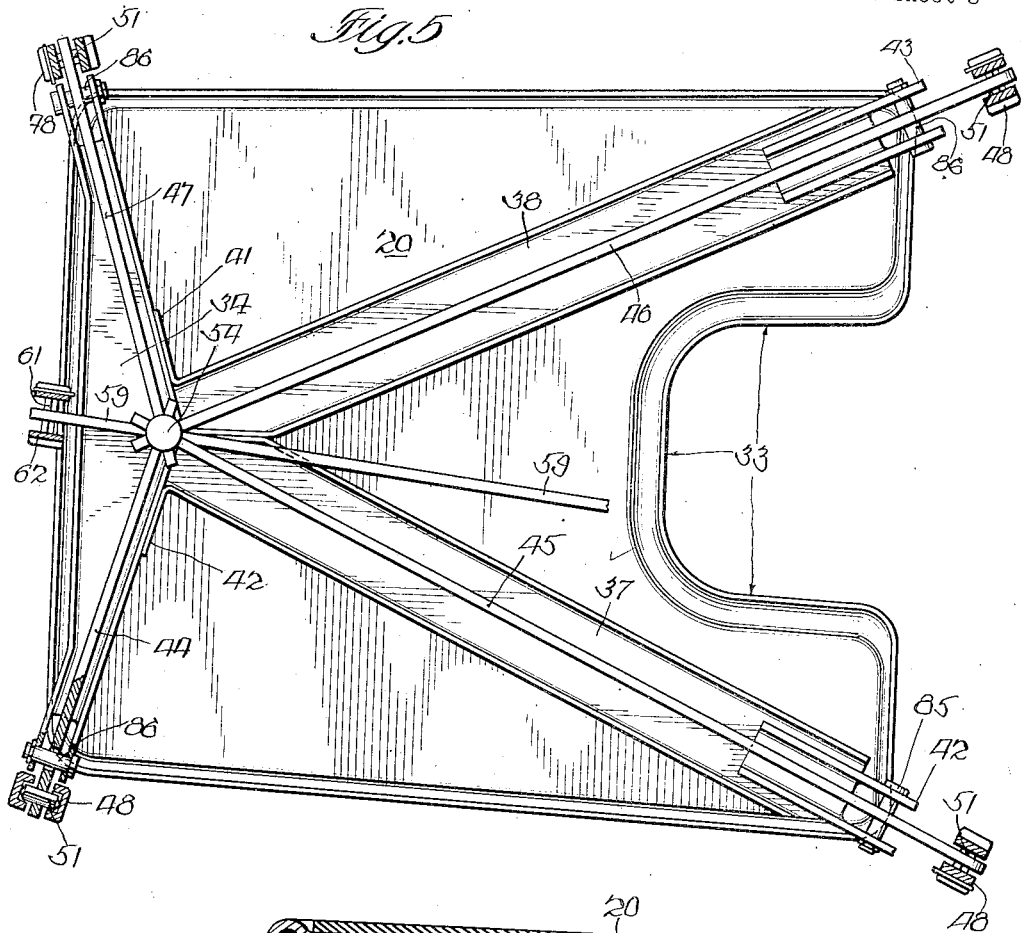
Figure 5 is an underneath detail plan view of the platform, illustrating the reinforced channel construction and the position of the pivotal centers thereof with respect to the platform and with respect to the pivotal centers of the equalizer arms.
Figure 6:
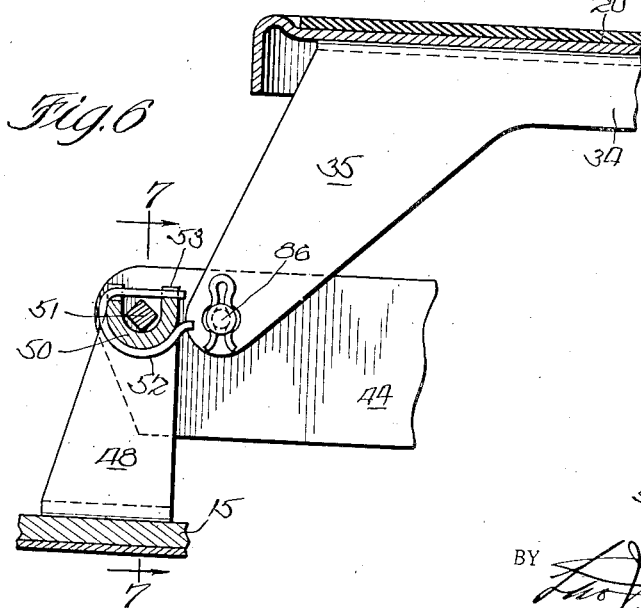
Figure 6 is an enlarged partial detail cross-sectional view taken on the line 6—6 of Figure 1.
Figure 7:
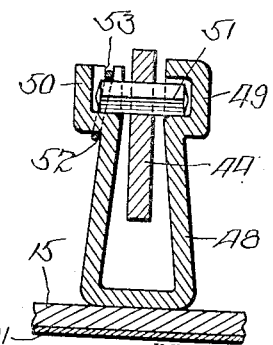
Figure 7 is an enlarged detail sectional view taken on the line 7—7 of Figure 6.

The numeral 15 designates the base of the scale which is preferably of angle iron formation and butt welded together to form a continuous piece. A cross-channel 16 is secured to the base 15 to increase its rigidity and it is to channel 16 that the unit 17, comprising a pendulum 18 and a dial 19, is mounted.

The base 15 has slightly converging sides and the platform 20 of the scale has its side edges parallel with the side edges of the base which enables a person to stand normally on the scale and with the toe portion of the foot on each side of the dial housing 21, which is preferably of the contour of the dial 19 and extends from the casing 22 that encloses the scale. The dial housing 21 is provided with a relatively long and narrow opening 23 therein, over which transparent means, such as celluloid or glass 24, is positioned and secured by a bezel 25. A slide member 26 is retained for sliding movements on the underneath side of the dial housing 21 below the opening 23 therein and is guided by a stud 27 and manually operable by a knob 28 which extends through an elongated slot opening 29 in the dial housing. This slide member 26 is arranged with an opening 30 therein across which a wire 31 is secured and which serves to extend across and above the surface of the dial 19 so as to be manually adjusted by the knob 28 to position the same to "0" position of the dial. This adjustment is for the purpose of setting the dial to "0" position so as to obtain perfect accuracy during the weighing of a person and this adjustment is primarily for the purpose of adjusting the scale to "0" position due to an irregular surface on which the scale may rest. The casing 22 is provided with an opening 32 through which the platform 20 extends and through which it moves vertically when a weight is placed thereon. The platform 20 is preferably formed of sheet metal and is cut away at 33 to extend on each side of the dial housing 21 and the side edges of the platform 20 are formed downwardly to provide a neat appearance to the scale as well as to add rigidity to the platform. At one end, the platform 20 is provided with an angularly formed channel 34, the free ends of which channel are directed downwardly and extend outwardly of the extreme opposite corners of the platform as indicated at 35—36. A pair of channel members 37 and 38, respectively, are welded or otherwise secured to the underneath side of the platform and are arranged in the form of a V, being secured together at 39 and secured at 40—41 to the formed channel 34 and extending on each side of the cut away portion 33 to the end of the platform. At the extreme ends of each of these channel members is secured a downwardly and outwardly directed bracket 42 and 43, respectively, which serve as pivotal points for the forward end of the platform. These brackets 42 and 43 serve with the portions 35 and 36 of the channel 34 to pivotally support the platform 20 on equalizer arms 44, 45, 46 and 47.

The equalizer arms are pivotally supported on brackets 48 that are fixed to the base 15 and directed upwardly and of U-formation being each provided with oppositely directed cup-shaped formations 49 and 50 to receive therein the squared pivot pin 51 of each of the equalizer arms 44, 45, 46 and 47. Each of the equalizer arms is supported and retained in a like manner and it is thought that a description of one will suffice for a description of all. The cup-shaped formation 50 is open at the top so that by tilting the equalizer arm at an angle when assembling, one end of the pivot 51 may be inserted into the cup formation 49 and the other end of the pivot 51 may then drop into the cup 50 through the opening at the top thereof. This arrangement is to facilitate assembling, and when assembled, a spring ring 52 is snapped into position over the cup 50 and retained by means of its entry into a groove 53 formed therein. Each of the brackets 48 is secured in position at a given angle on the base 15, so as to be directed to a common center and when the equalizer arms 44, 45, 46 and 47 are placed in position in the brackets 48, they are also directed to a common center and are retained for movement with each other by means of a connecting member 54. This connecting member 54 is provided with a plurality of openings 55 therein, as is clearly shown in Fig. 9, and these openings are each arranged at given angles to receive the equalizer arms and are each provided with an apex 56 on which the reduced ends 57 of the equalizer arms rest and which apexes form a point contact axially of the connecting member 54. This connecting member 54 is provided with a slot opening 58 into which an operating arm 59 is adapted to fit and to which arm the connecting member 54 is secured by means of a pin 60.

In this manner, the operating arm 59 extends across a common center of the equalizer arms being secured for movement therewith at 60 and extends outwardly on each side thereof and has one end pivotally secured at 61 to a bracket 62 which is secured to the base 15. The free end of the operating arm 59 extends inwardly of the machine and is attached at 63 to a flexible band 64 that partially surrounds a cam portion 65 of the pendulum 18 and is secured to the cam at 66.

The pendulum 18 is arranged as an integral part of the cam 65 and is fixedly secured by a screw 67a to a shaft 67 which extends outwardly of each side of the cam 65, (Fig. 4), and is journaled in ball bearing races 68 and 69, respectively, which are carried in ears 70 and 71 extending from a frame 72 supporting the pendulum unit 17. On one end of the pendulum shaft 67 is secured a collar 73 to which a segmental gear 74 is fixedly secured and on which a companion segmental gear 75 is loosely carried. This loosely carried segmental gear 75 has a small weight 76 secured thereto by a pin 77 which extends through an elongated slot opening 78 in the fixed segmental gear 74. Both of the segmental gears 74 and 75 are in mesh with a pinion 79 which is pivotally supported on ball races 80 and 81, respectively, and secured in position on the frame 72 of the unit 17 by means of a screw 82 extending through the ball races 80 and 81 and is retained in position by lock nut 83.

The pinion 79 has the dial 19 secured thereto and the periphery of the dial surrounds one end of the pendulum shaft 67 and encloses the segmental gears 74 and 75 to bring the dial in close proximity with the side wall of the frame 72 of unit 17.

The ball bearing races 68—69 for the pendulum 18 and the ball bearing races 80—81 for the dial 19 serve to reduce the frictional resistance of the swinging movements of the pendulum and the rotating movements of the dial to a minimum, permitting of a relatively light weight in proportion to the weight of the scale as a whole, for providing the sensitive movement of the pendulum and dial upon the movement of the platform. By this construction and the leverage action of the operating arm 59, it is possible with a pendulum weight of approximately one pound to correctly and accurately weigh articles to three hundred pounds.

In order to facilitate assembling of the scale, the equalizer arm 45 is provided with a vertically disposed notch 84 which receives a pin 85 secured in bracket 42 and which pin serves, when positioned in the slot 84, to align the platform with the brackets 43 and 35 and 36 thereof with respect to the equalizer arms. The remaining pivot pins 86 are then inserted after the platform is in position to retain the same in fixed pivotal relation with the equalizer arms and when the platform is thus positioned, the casing 22 is then set into position to enclose the scale.

In its operation, a weight placed upon the platform 20 of the scale is transmitted to the equalizer arms through pins 85 and 86 to rock the equalizer arms 44, 45, 46 and 47 downwardly and this downward motion of the equalizer arms is transmitted to the connecting member 54, and this movement of the member 54 exerts a pull on the operating arm 59 to rock the same on its pivot 61 and exerts a pull on the flexible band 64 to exert a rocking movement to the cam 65 against the weight of the pendulum 18. This rocking movement of the pendulum carries the fixed segmental gear 74 therewith to rotate the pinion 79 and dial 19. While the fixed segmental gear is rotating the pinion, the loose segmental gear 75 will be carried therewith by meshing engagement with the pinion 79, and the weight 76 thereon will exert a downward strain to the turning movements of the segmental gear and pinion and retain the same against back lash in the meshing of the gears, thereby retaining the dial from quivering movements even though a weight is unevenly placed on the platform of the scale.

While transporting the scale from place to place or setting it in various places, the pendulum would be free to swing and should it do this, may cause considerable damage to the scale according to the position in which it is held while being transported. In order to avoid this type of accident occurring, a pendulum locking means is provided, and this means is automatically operable to lock the pendulum when the scale is lifted from the surface on which it rests. This pendulum locking means comprises a fifth leg 87 pivotally arranged for swinging movements on a pin 88 supported by a bracket 89 fixed to the base 15. This leg 87 is movable while the feet 90 of the scale are secured in the base 15 and serve to retain a bottom plate 91 in position to enclose the bottom of the scale. This leg 87 extends through an opening 92 in the bottom plate 91 and is provided with a downwardly directed extension 93 directly below the pivot 88 which extends into a slot 94 provided in one end of a rockable arm 95 pivotally carried at 96 on the base 15. The other end of the arm 95 has a wire 97 pivotally fixed thereto at 97a and this wire is formed with a plurality of kinks 97b intermediate its length and has its other end secured at 98a to a swingable member 98 that is pivoted on a horizontal pin 99 carried in a bracket 100 secured to the channel 16. The member 98 is provided with an inwardly directed portion 101 which is normally held out of the path of the pendulum 18 when the scale is on a surface and the leg 87 is in raised position, and this portion 101 is carried into the path of swinging movement of the pendulum when the member 98 is swung upwardly by reason of the leg 87 dropping downwardly when the machine is lifted. When the portion 101 is in raised position with the arm 98, it serves to retain the pendulum from movement in one direction while a rubber bumper 106 extending from the frame 72 of the unit 17 retains the pendulum from movement in the other direction and it is between these two obstructions 101 and 106 that the pendulum is retained during the time the scale is being moved about. The kinks 97b provided in the wire are for the purpose of forming a yielding connection between the rockable arm 95 and the swingable member 98, so that, should a greater pull be exerted on the wire due to the leg 87 being raised higher than normal, the kinks 97b will permit of a yieldable connection. Should the pendulum 18 be in a position beyond the inwardly directed portion 101 of the member 98 and this member 98 is rocked upwardly, the weight of the pendulum on its restoring movement would depress and swing the member 98 downwardly against a spring 102. After the pendulum had passed the portion 101, the spring would then restore the member 98 in position to lock the pendulum.

The spring 102 is carried on the pin 99 and normally tends to swing the member 98 upwardly so that when the machine is on a surface, the leg 87 through the wire 97 retains the member 98 downwardly against the tension of spring 102 and this spring assists in raising the member upwardly when the scale is lifted.

In Fig. 10, I have shown a modified form of connecting member 54a which is preferably of tubular formation and provided with a plurality of angularly disposed slot openings 55a in fixed spaced relation in the walls thereof through which the reduced ends 57a of the equalizer arms extend and which arms are retained in spaced relation with each other by a ball bearing 103 spaced therebetween and which serves to permit of a rocking as well as a longitudinal movement of the equalizer arms when they are depressed due to a weight placed on the platform. The lower end of this tubular connecting member 54a has a plug 104 positioned therein to retain the lowermost ball bearing 103 and the lower free end of the tube is rolled as at 105 to secure the plug 104 and balls 103 in position above and below each of the equalizer arms.

It will be noted that in the construction thus illustrated, that the unit 17, including the pendulum and dial with its operative parts may be bodily positioned vertically at any given height by elongating the flexible band 64 and in so doing, the indicator dial may be brought closer to the vision of the person being weighed.

Prior to a person standing on the platform 20, the knob 28 may be manually gripped to slide the slide member 26 and position the wire 31 directly over the "0" of the dial 19, which has indicia thereon ranging from "0" to "300" permitting of a three hundred pound capacity of the scale.

I claim:

1. In a portable weighing scale the combination of a base member and a platform member, lever means supported on the base member and carrying the platform member, indicator means mounted on one of said members and drivingly connected with said lever means, a pendulum swingably mounted on one of said members and drivingly connected to counterbalance said lever means, a fixed stop for limiting the swinging movement of said pendulum in one direction, and latch means for holding said pendulum against said stop, said latch means being ineffective for holding the pendulum when the scale is in weighing position on a support floor but operating to hold said pendulum when the scale is lifted.

2. In a portable weighing scale the combination of a base member and a platform member, lever means supported on the base member and carrying the platform member, indicator means mounted on one of said members and drivingly connected with said lever means, a pendulum swingably mounted on one of said members and drivingly connected to counterbalance said lever means, a fixed stop for limiting the swinging movement of said pendulum in one direction, and latch means for holding said pendulum against said stop, said latch means comprising a latch member movable to holding position in the path of movement of said pendulum, and latch operating means drivingly connected with said latch member and including a leg member projecting at said base member and operable to retain the latch member out of holding position when the scale is in weighing position on a supporting floor, said latch operating means serving to project the latch member into pendulum holding position when the scale is lifted.

3. In a portable weighing scale the combination of a base member and a platform member, lever means supported on the base member and carrying the platform member, indicator means mounted on one of said members and drivingly connected with said lever means, a pendulum swingably mounted on one of said members and drivingly connected to counterbalance said lever means, a fixed stop for limiting the swinging movement of said pendulum in one direction, and latch means for holding said pendulum against said stop, said latch means comprising a latch member movable to holding position in the path of movement of said pendulum, yielding means normally urging the latch member toward holding position, and a latch releasing member projecting at said base member and connected with said latch member, said latch releasing member serving, only when the scale is in weighing position on a supporting floor, to retract the latch from holding position against the influence of said yielding means and thus release the pendulum for operation.

4. In a portable weighing scale the combination of a base member and a platform member, lever means supported on the base member and carrying the platform member, indicator means mounted on one of said members and drivingly connected with said lever means, a pendulum swingably mounted on one of said members and drivingly connected to counterbalance said lever means, a fixed stop for limiting the swinging movement of said pendulum in one direction, and latch means for holding said pendulum against said stop, said latch means comprising a tiltable element movable into the path of movement of the pendulum, a leg movably mounted on the base member and drivingly connected with said tiltable element, said leg being normally held in position retaining said tiltable element out of the path of movement of the pendulum when the scale is in weighing position on a supporting floor and releasing said tiltable element for movement into the path of the pendulum when the scale is out of weighing position.

5. In a portable weighing scale the combination of a base member and a platform member, lever means supported on the base member and carrying the platform member, indicator means mounted on one of said members and drivingly connected with said lever means, a pendulum swingably mounted on one of said members and drivingly connected to counterbalance said lever means, a fixed stop for limiting the swinging movement of said pendulum in one direction, and latch means for holding said pendulum against said stop, said latch means comprising a formed sheet metal lever pivoted on a pin supported on one of said members, said lever having an arm swingable into holding position in the path of movement of said pendulum, yielding means comprising a spring normally urging said lever toward holding position, a latch releasing member projecting at said base member and connected with said latch member, said latch releasing member serving, only when the scale is in weighing position on a supporting floor, to retract the latch from holding position against the influence of said yielding means and thus release the pendulum for operation.

6. In a portable weighing scale the combination of a base member and a platform member, lever means supported on the base member and carrying the platform member, indicator means mounted on one of said members and drivingly connected with said lever means, a mounting frame secured on one of said members, a pendulum swingably supported in said mounting frame and drivingly connected to counterbalance said lever means, a fixed stop on said mounting frame for limiting the swinging movement of said pendulum in one direction, and latch means for holding the pendulum against said stop, said latch means being ineffective for holding the pendulum when the scale is in weighing position on a support floor but operating to hold said pendulum when the scale is lifted.

7. In a portable weighing scale the combination of a base member and a platform member, lever means supported on the base member and carrying the platform member, indicator means mounted on one of said members and drivingly connected with said lever means, a mounting frame secured on one of said members, a pendulum swingably supported in said mounting frame and drivingly connected to counterbalance said lever means, a fixed stop on said mounting frame for limiting the swinging movement of said pendulum in one direction, and latch means for holding the pendulum against said stop, said latch means comprising a latch member movable on said mounting frame into holding position in the path of movement of the pendulum, and latch operating means drivingly connected with said latch member and including a leg member projecting at said base member and operable to retain the latch member out of holding position when the scale is in weighing position on a supporting floor, said latch operating means serving to project the latch member into pendulum holding position when the scale is lifted.

8. In a portable weighing scale the combination of a base member and a platform member, lever means supported on the base member and carrying the platform member, a mounting frame secured on one of said members, indicator means supported on said frame, a pendulum swingably mounted on said frame, said indicator means and pendulum being drivingly connected with said lever means, a fixed stop for limiting the swinging movement of said pendulum in one direction on said frame, and latch means for holding said pendulum against said stop, said latch means comprising a latch member movable on said frame to holding position in the path of movement of said pendulum means, yielding means normally urging said latch member toward holding position on said frame and a latch releasing member projecting at said base member and connected with said latch member, said latch releasing member serving, only when the scale is in weighing position on a supporting floor, to retract the latch from holding position against the influence of said yielding means and thus release the pendulum for operation.

MAX GARBELL.